United States Patent
Bratton et al.

(10) Patent No.: US 6,383,563 B1
(45) Date of Patent: *May 7, 2002

(54) MEMBRANE

(75) Inventors: Graham John Bratton, Sidcup; Karon Doreen Buck, West Kingsdown; Timothy De Villiers Naylor, Englefield Green, all of (GB)

(73) Assignee: Smart (Isle of Man) Limited, Douglas (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,316
(22) PCT Filed: Apr. 2, 1997
(86) PCT No.: PCT/GB97/00928
 § 371 Date: Sep. 25, 1998
 § 102(e) Date: Sep. 25, 1998
(87) PCT Pub. No.: WO97/37752
 PCT Pub. Date: Oct. 16, 1997

(30) Foreign Application Priority Data

Apr. 3, 1996 (GB) .............................................. 9607090

(51) Int. Cl.$^7$ ................................................. B05D 5/00
(52) U.S. Cl. ...................... 427/244; 427/245; 427/299; 427/387; 427/397.7; 427/419.2; 427/419.7; 427/419.8
(58) Field of Search ............................ 427/387, 397.7, 427/397.8, 244, 245, 214, 215, 220, 376.2, 301, 419.8, 419.2, 419.7, 299

(56) References Cited

U.S. PATENT DOCUMENTS

| | | | | |
|---|---|---|---|---|
| 3,041,205 A | * | 6/1962 | Iler | 427/397.8 |
| 4,125,651 A | * | 11/1978 | Campbell et al. | 427/397.8 |
| 4,157,315 A | * | 6/1979 | Michels et al. | 427/397.8 |

(List continued on next page.)

FOREIGN PATENT DOCUMENTS

| | | |
|---|---|---|
| WO | WO 92/13631 | 8/1992 |
| WO | WO 96/01682 | 1/1996 |
| WO | WO 96/01686 | 1/1996 |
| WO | WO 96/09110 | 3/1996 |

OTHER PUBLICATIONS

*Hawley's Condensed Chemical Dictionary*, 12th ed., p. 780, 1993.*

Catalyst Letters, vol. 1 No. 11, Aug. 1988, pp. 395–403, XP000003146, Asakura et al. "Selective Isopentane formation from CH3OH on a new One–Atomic Layer ZR02/ZSM–5Hybrid Catalyst".

Primary Examiner—Shrive P. Beck
Assistant Examiner—Kirsten A. Crockford
(74) Attorney, Agent, or Firm—Wenderoth, Lind & Ponack, L.L.P.

(57) ABSTRACT

A process for treating zeolite membranes to improve their performance and to improve their coherence consists of forming a film of zeolite material on a porous support to form a zeolite membrane, contacting the membrane with tetraethylorthosilicate (TEOS), and reacting said TEOS with said zeolite membrane to form a supported membrane with open pores without defective pin holes. The process may further comprise pre-treatment of the porous support with a zeolite initiating agent, or post-treatment of the treated membrane with a silicic or polysilicic acid.

5 Claims, 1 Drawing Sheet

U.S. PATENT DOCUMENTS

| | | | |
|---|---|---|---|
| 4,471,023 A | * 9/1984 | Shuford | 427/397.8 |
| 4,551,356 A | * 11/1985 | Heiz | 427/397.8 |
| 4,770,908 A | * 9/1988 | Mori et al. | 427/397.8 |
| 5,091,224 A | * 2/1992 | Kushida et al. | 427/397.8 |
| 5,330,794 A | * 7/1994 | Bosco et al. | 427/397.8 |
| 5,356,722 A | * 10/1994 | Nguyen et al. | 427/419.2 |
| 5,407,703 A | * 4/1995 | de Jong et al. | 427/419.2 |
| 5,449,533 A | * 9/1995 | Morizane | 427/397.8 |
| 5,462,899 A | * 10/1995 | Ikeda | 437/238 |
| 5,498,284 A | * 3/1996 | Neely, Jr. | 427/397.8 |
| 5,622,751 A | * 4/1997 | Thebault et al. | 427/419.2 |
| 5,650,030 A | * 7/1997 | Kyricos | 427/397.8 |
| 5,672,388 A | * 9/1997 | McHenry et al. | 427/255.37 |
| 5,700,523 A | * 12/1997 | Petrole et al. | 427/397.8 |
| 5,702,761 A | * 12/1997 | DiChiara, Jr. et al. | 427/397.8 |
| 5,874,153 A | * 2/1999 | Bode et al. | 427/419.2 |

* cited by examiner

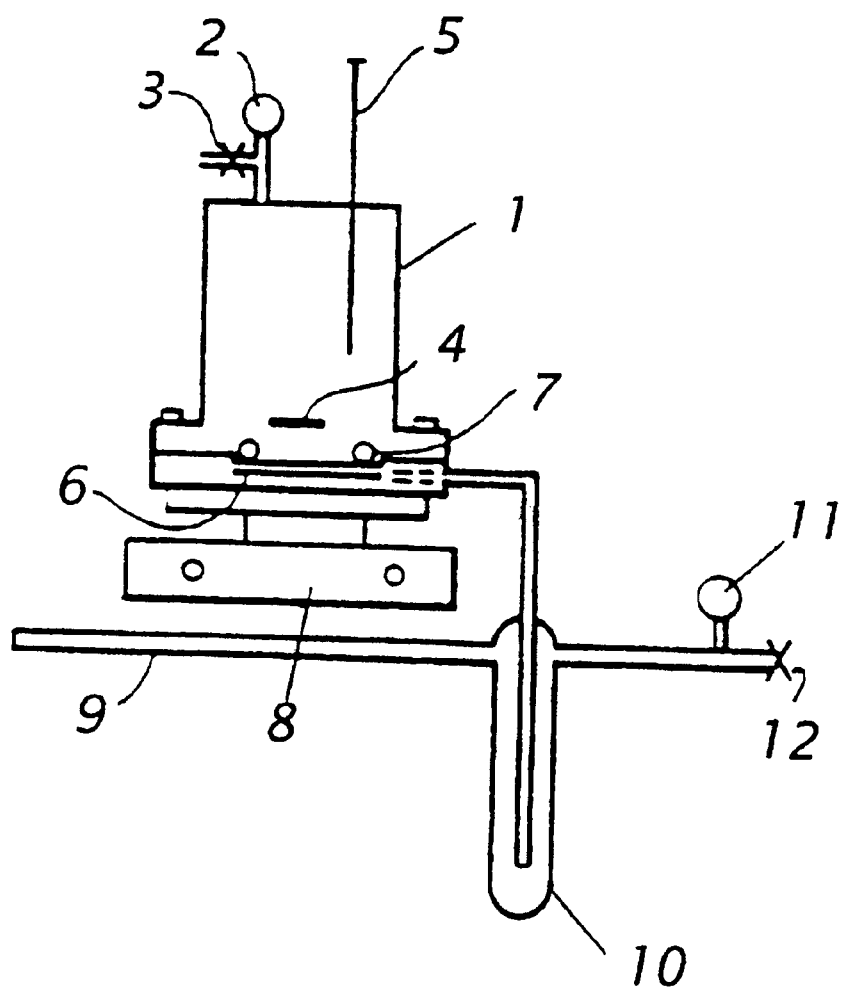

MEMBRANE

The present invention relates to an improved membrane and a process for producing improved membranes.

It is well known to use zeolites and similar crystalline zeolitic materials in separations and as catalysts. Zeolitic membranes and membranes which incorporate zeolites are also well known and can come in a range of different types. European Patent Application 0481660 discloses and discusses prior art zeo-type membranes and refers in particular to U.S. Pat. Nos. 3,244,643, 3,730,910 and 4,578,372, Applied Catalysts 49(1989) 1-25, DE-A-3827049, CA1235684, JP-A-63287504, JP-A-63291809, EP-A-180200, EP-A-135069.

It is disclosed in EP 0481 658 A1 to surface coat a porous support on which a zeo-type material is deposited by crystallisation from a synthesis gel with a surface coating of nickel cobalt or molybdenum in the form of the metal and/or oxide.

The methods disclosed for forming this surface coating include vapour deposition, vacuum evaporation, Rf sputtering or electroplating or deposition of a salt from a liquid and oxidising the salt. These methods give a surface coating on the porous support of varying thicknesses and provide for improved crystal deposition from the gel mainly round the wires of the support with little improvement in filling the voids after a single growth. EP 0481 659 A1 discloses a similar process for pre-treating a porous support, except that the porous support is pre-treated with an acid.

The process of EP 0481660 A1 discloses treating the porous support a plurality of times with the synthesis gel and crystallising a zeo-type material from tinc gel in order to obtain an improved coating. However, this process can leave gel and other debris blocking the pores of the porous support and thus prevent complete coverage, even wiping between zeolite growths will leave debris behind.

However, these processes do not produce a defect free membrane without a plurality of growths and they do not bridge the voids after a single growth, and even though these patent applications disclose repeated retreatment with the gel as being required to block "pin holes", these existing methods have not proved successful. Even small defects or pinholes can have a marked deleterious effect on the performance of membranes and can render them of substantially little value in many operations. This is because in many separation operations the effect of defects is essentially to provide a channel where the unseparated products can pass.

Some existing methods claim that a defect tree membrane is obtained on a laboratory scale, but attempts to provide a substantially defect free membrane on a larger scale have proved unsuccessful.

In order to provide an imp roved membrane with better performance characteristics, we have devised a treatment for such membranes.

According to the invention, there is provided a process for treating a membrane comprising a film of a crystalline zeo-type material which process comprises treating the membrane with a silicon or other metal compound capable of reacting with the membrane either before, after or instead of the treatment of the membrane with a silicic acid or polysilicic acid as set out in patent application PCT/GB95/00956.

Zeo-type materials are also known as molecular sieves which are widely known and used. They comprise an extended network of channels formed from silicon/oxygen tetrahedrons joined through the oxygen atoms. Zeolites and alumino-silicates are the most commonly known form of zeo-type materials and the present invention is applicable to any membrane formed from zeo-type materials and particularly applicable to zeolites and alumino-silicates. In the "Atlas of Zeolite Structure Types", Meier and Ofsen, 1987, Polycrystal Book Service, Pittsburg USA, various types of structure are described and, for example, those described as having LTA, MEL, MFI or TON structure can be used.

In "New Developments in Zeolite Science and Technology Proceedings of the 7th International Conference, Tokyo, 1986, page 103, another class of zeo-type materialsare disclosed as crystalline aluminophosphate, silicoalumina phosphates and other metallo-alumino phosphates.

Typical zeolites which can be used in the present invention are include but are not limited to, 3A, 4A, 5A, 13X, X, Y, ZSM5, MPOs, SAPOs, Silicalite, β or theta or theta-1, etc.

The porous supports on which zeo-type membranes are formed and which can be used in the present invention include those formed of metals, ceramics, glass, mineral, carbon or polymer fibres or cellulosic or organic or inorganic polymers. Suitable metals include titanium, chromium and alloys such as those sold under the Trade Marks "Fecralloy" and "Hastalloy" and stainless steels. The porous supports may be formed of a mesh or from sintered metal particles or a mixture of both. These are commonly sold in the form of filters.

Porous ceramics, glass mineral or carbon materials can be used including porous silicon and other carbides, clays and other silicates and porous silica. If desired, the support can be a zeolite formed by compression or using a binder, or by the conversion of meta kaolin to a zeolite. The shape of the support is not critical, for example, flat sheet, tubular, wound spiral, etc. can be used. If polymeric materials are used, these can optionally be film coated with metal or metal oxide or a silicic acid as herein defined.

The porous support can be also be a granular solid e.g. formed of particles of a closely packed material such as a pellitised catalyst.

The present invention can be used with porous supports of any suitable size although, for large flux rates through a membrane, large pore sizes are preferred. Preferably pore sizes of 0.01 to 2,000 microns, more preferably of 0.01 to 200 and ideally of 0.01 to 5 microns are used. Pore sizes up to 300 microns can be determined by bubble point pressure as specified in ISO 4003. Larger pore sizes can be measured by microscopic methods. The larger the relative amount of the surface which is composed of voids in general the more suitable the porous support.

The membranes which can be treated by the method of the present invention can be formed by any method, for example by crystallisation from a gel or solution, by plasma deposition or by any other method such as electrodeposition of crystals on conducting substrates e.g. as described in DE 4109037 or the conversion of meta kaolin to a zeolite.

When the membrane comprising a film of zeo-type material is prepared by crystallisation from a synthesis gel, any of the methods described in the prior art can be used.

The synthesis gel used in the process can be any gel which is capable of producing the desired crystalline zeo-type material. Gels for the synthesis of zeo-type materials are well known and are described in the prior art given above or, for example, in EP-A-57049, EP-A-104800, EP-A-2899 and EP-A-2900. Standard text books by D W Breck ("Zeolites Molecular Sieves, Structure Chemistry and Use") published by John Wiley (1974) and P. A Jacobs and J. A Martens (Studies in Surface Science and Catalysis No. 33, Synthesis of High Silica Alumino silicate Zeolites" published by Elsevier (1987), describe many such synthesis gels. The process which can be used includes conventional syntheses of zeo-type materials, except that the synthesis is carried out in the presence of the porous support. Most commonly, gels are crystallised by the application of heat.

The membrane which is treated by the process of the invention can be prepared by a process which comprises deposition or crystallisation from a Larger pore medium. In one embodiment of the invention the growth medium can be used in two different methods. In the gel method (method 1) for forming the membrane the gel used to form the membrane preferably has a molar composition in the range of

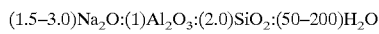

$$(1.5\text{–}3.0)Na_2O:(1)Al_2O_3:(2.0)SiO_2:(50\text{–}200)H_2O$$

and the method used can be used in any of the methods disclosed in the references listed above. In the liquid solution method (method 2) the liquid solution used to form the membrane preferably has a molar composition in the range of:

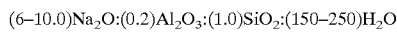

$$(6\text{–}10.0)Na_2O:(0.2)Al_2O_3:(1.0)SiO_2:(150\text{–}250)H_2O$$

The liquid solution preferably contains a maximum amount of the compound capable of crystallising to form a zeo-type material whilst still remaining a liquid solution. By maximum amount is meant the maximum amount which can be maintained in solution so that no precipitation occurs before zeolite formation.

Methods (1) and (2) can be used under the conditions listed below and method (1) and method (2) can be used either on their own or with method (1) followed by method (2) or vice versa.

The conditions which can be used for forming the membrane are with a temperature of the growth solution preferably in the range of 50 to 100° C. and the pH can be adjusted e.g. to pH of 12.5 to 14 by addition of sodium hydroxide or ammonia. If desired the sodium ion concentration can be increased without increasing the pH by the addition of a sodium salt such as sodium chloride. The growth solution can be seeded with zeolite crystals of the desired zeolite to be synthesised. The membrane can be washed to pH neutral after membrane formation prior to any post-treatment.

The porous support can be contacted with the growth medium by immersion or by pouring the growth medium over the support with the support held substantially horizontal, either face up at the bottom of a container, or face down at the surface of the growth medium, or it can be passed over one or both sides of the support, with the support held substantially horizontal, or it can be passed over one or both sides of the support with the support held substantially vertical or the support can be in any intermediate position or down the inside of a tubular support.

The growth medium can be kept static, stirred, tumbled or passed over or around the support, alternatively the growth medium can be passed over both sides of the support or vertically up and down the inside or outside of a tubular support with the support held substantially horizontal or at any intermediate position.

Pressure may also be applied but it is usually convenient to conduct the crystallisation under autogenous pressure. Preferably the porous support is completely immersed in the growth medium; alternatively, if desired, only one surface of the support may be in contact with the growth medium.

This may be useful, for example, if it is desired to produce a membrane in the form of a tube, where only the inside or outside of the tube need be in contact with the growth medium or the growth medium can be contacted with the inside or outside of a vertical tubular support.

It may be useful if it is desired to produce a membrane containing two different zeolites, one on each side of the support. Use of such a bi-functional membrane would be equivalent to using two separate membranes, each carrying a different zeolite.

If desired, the treatment with the gel or liquid solution can be repeated one or more times to obtain thicker membrane coatings and/or more coherent coatings.

Preferably the porous support is pre-treated with a zeolite initiating agent. The zeolite initiating agent is preferably a cobalt, molybdenum or nickel oxide or it can be particles of a zeolite, e.g. the zeolite which it is intended to deposit on the porous support, or any combination of these. Another example of an initiating agent is a compound which can deposit a zeo-type pre-cursor material e.g. a silicic acid or polsilicic acid.

The zeolite initiation agent can be contacted with the porous support by a wet or dry process. If a dry process is used, the particles of the zeolite initiation agent can be rubbed into the surface of the porous material, or the porous material surface can be rubbed in the particles.

Alternatively the particles of the zeolite initiation agent can be caused to flow over and/or through the porous support, or pulled into the support by means of a vacuum.

If a wet process is used, a liquid suspension of powder of the zeolite initiation agent is formed and the liquid suspension contacted with the porous support to deposit the zeolite initiation agent on the support.

Before contacting the surface of the porous support with the zeolite initiation agent the surface is preferably wetted with wetting agent such as an alcohol, water or a mixture of these.

When a silicic acid is used as an initiating agent it can be a silicic acid as herein defined.

In the present specification by silicic acid is meant monosilicic, low, medium and high molecular weight polysilicic acids and mixtures thereof.

Preferred compounds used to treat the membrane according to the present invention include silicon, titanium, zirconium or any metal compound which can form a solution or gel and which can condense to form a polymeric type structure. For instance silicon containing compounds can include silanes, silicates and organic silicone polymers.

The preferred silanes are chloro, alkoxy, or any silane with a reactive group functionality which can undergo a condensation reaction.

The preferred silicates are those which have easily removable cations, e.g. mon- and di-valent cations.

The treatment with the silicon containing compound depends on the state of the silicon containing compound. If it is gaseous then the membrane can be contacted with the silicon containing compound in the gaseous state, preferably at an elevated temperature e.g. of above 0° C. and more preferably above 20° C.

If the silicon containing compound is a solid then it can be dissolved in a suitable solvent such as tetrahydofuran, ethanol, butanol or any protonated solvent and the membrane contacted with the solution.

If the silicon containing compound is a liquid then the membrane can be contacted with the liquid or a mixture of the liquid with a suitable solvent.

The other metal compounds other than silicon compounds useful in the present invention can be used in the form of a solution or gel of a metal oxide, alkoxide or hydroxide. Suitable metals include titanium, zirconium or any metal which can form a solution or gel and which can condense to form a polymeric type structure e.g. a suitable oxide, hydroxide, or alkoxide.

The membranes treated by this process are improved in terms of their performance and membrane strength compared with untreated membranes.

The membranes formed using the present invention can be used in a range of separation and catalytic processes, e.g. dehydration of LPG, air, alcohols and natural gas, removing linear alkanes, olefins and substituted hydrocarbons from mixtures with branched chain compounds, e.g. in reforming, dewaxing, etc., hydrogenation and dehydrogenation of linear hydrocarbon in admixture with branched chain compounds.

The invention is described in the following Examples in which Example 1 is the preparation of a membrane using a known method, Example 2 illustrates the test procedure used to test the membranes and the testing of a known membrane, Example 3 is an Example of production and testing of membrane according to the invention.

EXAMPLE 1

Membrane Growth

The substrate used was a Bekipor (Trade Mark) ST XLS361S3 filter. This consists of very fine 316 stainless steel fibres brought together in a 3-dimensional labyrinthic structure. The fibres are arranged randomly in a homogeneous web. This web is further compacted and sintered to give a very strong metallic bond at each fibre crossing. The average pore size is approximately 5.3 microns and the diameter of the wire on the surface is 2.0 microns. A 7 cm. disc of the metal mesh was degreased using toluene (3×50 ml aliquots) followed by and air dried prior to use.

The disc was then coated with 0.1 M cobalt nitrate solution, placed into an oven at 90° C. to dry, then fired at 125–300° C. for 4 hours. The disc was then removed from the furnace and allowed to cool. This was repeated a further three times to obtain a good cobalt oxide coating.

Zeolite A powder was rubbed into the active side of the substrate, using a gloved finger, until such time as no more could be rubbed into the surface. Any of the remaining excess was tapped off. The disc was then placed in a 100 ml flat bottomed petri dish which had previously been cleaned by washing with de-ionised water, acetone, toluene and finally acetone before drying in an oven at 100° C. for 3 hours.

All apparatus and equipment including the substrate and growth vessels were preheated to a temperature of 100° C.

Two solutions A and B were prepared as follows:

Solution A 3.75 g Sodium Hydroxide was dissolved in 148.6 g pre-heated de-ionised water. 24.29 g of Sodium Aluminate was then carefully added and the mixture stirred until dissolved. This solution was kept at 95–100° C.

The Sodium Aluminate had an actual composition 62.48% $Al_2O_3$, 35.24% $Na_2O$, and 2.28% $H_2O$.

Solution B 50.57 g Sodium Silicate (of composition 14.21% $Na_2O$, 35.59% $SiO_2$ and 50.20% $H_2O$) was dissolved in 148.6 g de-ionised water which had cooled to approximately 50° C.

Solution A was added slowly to solution B while stirring to ensure complete and even mixing (it is important that no lumps of hydrogel are formed). The flask was then covered and allowed to heat for a further 10–15 minutes. This resulted in a hydrogel having a molar composition 2.01 $Na_2O$:$Al_2O_3$:2.0 $SiO_2$:143.10 $H_2O$ 100 ml of the hydrogel was slowly poured into the preheated polypropylene growth vessel. This vessel contained the cobalt nitrate treated mesh which was suspended vertically on a plastic covered wire.

The growth vessel was placed in a domestic pressure cooker together with a beaker containing the remaining hydrogel solution. The pressure cooker was placed in an oven at 100° C. for 5 hours.

Subsequently it was removed from the oven and allowed to cool for 30 minutes. The growth vessel and the hydrogel solution poured into a container for disposal.

The metal mesh was carefully removed ensuring that the mesh was not bent or damaged in any way. The mesh was placed in a clean dry glass beaker and washed three times with 100 ml aliquots of de-ionised water, swirling the solution each time to ensure the removal of residues, and was then allowed to air dry overnight.

The surface of the dried coated mesh was subsequently wiped clean with a clean lens tissue in order to remove any loose powdery deposits which may have formed on the surface.

The membrane was then tested.

EXAMPLE 2

Membrane Test Procedure

The membrane is placed in a glass beaker and rinsed with 25 ml aliquots of de-ionised water until the wash water is at pH7. The membrane is placed into a pervaporation test cell in an apparatus as shown in the accompanying drawing.

The apparatus consists of a stainless steel test cell (1) fitted with a pressure gauge (2) relief valve (3) magnetic stirrer (4) and thermocouple (5). The membrane prepared as in Example 1 was placed on a porous stainless steel disc (6) and was sealed into the cell with a KALREZ (Trade Mark) O ring (7).

The cell could be simultaneously heated and stirred by a heater/stirrer (8). Vacuum could be applied through line (9). Vapour removed from the test cell was condensed out in cold trap (10). Line (9) had a pressure gauge (11) and relief valve (12).

200.0 gm of an isopropyl alcohol-ionised water (approx. 5% w/w water) solution was poured into the test cell. The solution was then heated to 70° C. and stirred at approximately 300 r.p.m.

The pressure on the underside of the membrane was reduced to 1 mbar (0.1 kN) by use of the vacuum line. Permeate was collected at noted intervals over a period of time weighed, and analysed to determine the concentration of water present. Feed water concentration was monitored throughout. The water flux and permeate water content as a function of feed water concentration are shown together in Table 1.

TABLE 1

| Time on Stream (hr) | Feed Water (% w/w) | Permeate Water (% w/w) | Permeate Flux (g/hr.) | Water Flux kg/m²/day |
|---|---|---|---|---|
| 1.25 | 3.72 | 38.52 | 11.67 | 59.55 |
| 2.00 | 0.83 | 10.15 | 12.31 | 16.55 |
| 2.75 | 0.54 | 4.49 | 12.25 | 7.29 |

EXAMPLE 3

Rapid Post—Treatment Preparation

Prepolymerised silicic acids in organic solution was prepared from "Soluble Sodium Silicate Powder" (ex Crosfield, Trade Name Pyramid P40) with mean $SiO_2$/$Na_2O$ weight ratio 2.00:1 and a molar ratio 2.06:1, mean $Na_2O$ 27%, mean $SiO_2$ 53%, mean water 20.00% and total solids 80%.

200.0 g (containing 106 g SiO$_2$) of this powder was dissolved in water (835 ml) to produce a solution which was added dropwise into an aqueous hydrochloric acid solution (3M, 100 ml) at 0–10° C. with stirring over a 45 minute period, followed by a further stirring for 90 minutes.

Tetrahydrofuran (THF, 1000 ml) and sodium chloride (500 g) were then added with stirring, followed by a further 60 minutes stirring and 30 minutes standing to produce an organic phase containing silicic acid and an aqueous phase.

The organic phase was separated and dried with a molecular sieve 4A (⅛ inch beads, 4–8 mesh, 200 g). To the dried phase was added n-butanol (1.28 liters) and the solution distilled for 2 hours to give a clear solution of prepolymerised silicic acid in butanol (500 g containing 103 g SiO$_2$) which is substantially anhydrous.

The silicic acid can be analyzed by treatment with chlorotrimethyl silane in dimethyl formamide to form trimethylsilyl derivatives followed by gel permeation chromatography and can form a single peak, found to be a mixture of polysilicic acids of mean molecular weight approximately 800 a.m.u.

Solution 2

The procedure of solution 1 was followed except that, after the addition of sodium silicate to the acid, the additional time of stirring was reduced to 45 minutes. This ultimately gave a lower molecular weight silicic acid than in solution 1, having a mean molecular weight of approximately 600 a.m.u.

Solution 3

The procedure of solution 1 was followed except that after the addition of sodium silicate to the acid there was no additional stirring. This ultimately gave a lower molecular weight silicic acid than in solution 1, having a mean molecular weight of 96 a.m.u.

EXAMPLE 4

Rapid Post Treatment

The rapid post treatment solution was prepared in a clean dry glass beaker using the following amounts of the solutions previously described.

| Name | Active Material (%) | Mass (g) |
| --- | --- | --- |
| Solution 1 | 26.64 | 3.13 |
| Solution 2 | 22.86 | 3.65 |
| Solution 3 | 21.22 | 3.93 |
| Ethanol | | 114.29 | i.e. 2.50 g of active silicic acid units in a 1:1 ratio.

2.50 g of PDMS (polydimethylsiloxane ex Huls-Petrach, viscosity 25–35 cSt) was added to this mixture, to give a ratio of silicic acids to PDMS of 1:1.

The cell was prepared by removing the IPA/H$_2$O solution and then rinsing with two 25 g aliquots of absolute ethanol. 50 g of absolute ethanol was then placed in the cell, the vacuum was applied for a period of approximately 15 minutes, to replace any water in the membrane pores with absolute ethanol. The ethanol was then poured out from the cell and the post treatment solution was added to the cold cell. The vacuum was applied and the solution was then heated to 70° C. and stirred at 300 r.p.m.

After the first 1.5 hours the permeate was weighed but not recycled. The permeate was then weighed every 0.5 of an hour until such time as it was less than 0.05 g. When this occurred, the post treatment solution was removed from the cell, which was then rinsed with two 25 ml aliquots of absolute ethanol. The heating and stirring was then stopped. A stream of air was passed over the membrane, using a compressor, for a period of one hour.

After this period a test solution of approximately 200 g of an isopropyl alcohol/de-ionised water solution (~5% water) was then placed into the cell, heated to 70° C. and stirred at approximately 300 r.p.m.

The membrane was tested as before.

Results are shown in Table 2.

TABLE 2

| Time on Stream (hr) | Feed Water (% w/w) | Permeate Water (% w/w) | Permeate Flux (g/hr.) | Water Flux kg/m$^2$/day |
| --- | --- | --- | --- | --- |
| 0.25 | 3.76 | 98.85 | 2.46 | 32.22 |
| 0.75 | 3.15 | 99.37 | 5.38 | 70.83 |
| 1.25 | 1.29 | 98.37 | 3.15 | 41.05 |
| 1.75 | 1.00 | 96.93 | 1.84 | 21.63 |

EXAMPLE 5

TEOS Treatment

The TEOS treatment solution comprising 4.0 g of tetraethylorthosilicate (TEOS)

18.0 g of de-ionised water 18.0 g of ethanol was placed into a clean dry 100 ml beaker. This mixture was then poured onto the membrane in the test cell, through an opening in the top of the cell, using a funnel. The underside of the membrane was then placed under a vacuum (1 mbar), so as to pull the solution through the pores in the membrane. The solution within the cell was also heated to 70° C. and stirred at approximately 300 r.p.m. with a magnetic stirrer for a period of 19 hours.

After this period, the contents of the cell were removed and the cell was rinsed out with four 50 ml aliquots of de-ionised water. The membrane was air dried by passing a stream of compressed air through the cell for a period of 1 hour. Approximately 200 g of an isopropyl alcohol/de-ionised water solution (~5% w/w water) was then placed into the cell, heated to 70° C. and stirred at approximately 300 r.p.m. The membrane was then tested as above and the results shown in table 3.

TABLE 3

| Time on Stream (hr) | Feed Water (% w/w) | Permeate Water (% w/w) | Permeate Flux (g/hr.) | Water Flux kg/m$^2$/day |
| --- | --- | --- | --- | --- |
| 0.50 | 3.75 | 99.01 | 6.83 | 89.59 |
| 1.75 | 1.89 | 100.00 | 2.22 | 29.42 |
| 2.50 | 0.48 | 81.12 | 0.79 | 8.49 |
| 3.50 | 0.19 | 73.62 | 0.12 | 1.17 |

What is claimed is:

1. A process for producing a zeolite membrane with pores while free of defective pin holes consisting of:
   (a) forming a film of zeolite material with pores and defective pin holes on a porous support to form a zeolite membrane on said porous support;
   (b) contacting said zeolite membrane with tetraethylorthosilicate and sealing said pinholes while leaving said pores open; and (c) reacting said tetraethylorthosilicate with said zeolite membrane to form a supported membrane with open pores without defective pin holes.

2. A process for producing a zeolite membrane with pores but substantially free of pin holes consisting of:

(a) selecting a porous support having a pore size within the range of 0.01 to 5.0 microns from the group consisting of metal mesh and porous ceramics;

(b) pretreating said porous support with a zeolite initiating agent;

(c) treating said pretreated porous support with tetraethylorthosilicate;

(d) reacting said tetraethylorthosilicate with said support and forming a zeolite membrane having pores but substantially no pin holes on said porous support; and (e) treating said zeolite membrane with a post treatment of silicic or polysilicic acid.

3. A process for producing a zeolite membrane with pores while free of defective pin holes consisting of:

(a) pretreating a porous support with a zeolite initiating agent;

(b) forming a film of zeolite material with pores and defective pin holes on said porous support to form a zeolite membrane on said porous support;

(c) contacting said zeolite membrane with tetraethylorthosilicate and sealing said pinholes while leaving said pores open;

(d) reacting said tetraethylorthosilicate with said zeolite membrane to form a supported membrane with open pores without defective pin holes; and (e) after step (d), treating said membrane in a post treatment.

4. The process of claim 3 wherein said initiating agent is selected from the group consisting of cobalt, molybdenum, nickel oxide, particles of zeolite material, silicic acid and polysilicic acid.

5. The process of claim 3 in which said post treatment comprises treatment with a silicic or polysilicic acid.

* * * * *